US008993131B2

(12) United States Patent
Anderson et al.

(10) Patent No.: US 8,993,131 B2
(45) Date of Patent: Mar. 31, 2015

(54) METAL SUBSTRATES INCLUDING METAL OXIDE NANOPOROUS THIN FILMS AND METHODS OF MAKING THE SAME

(75) Inventors: Marc A. Anderson, Madison, WI (US); M. Isabel Tejedor, Madison, WI (US); Ole Christensen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 627 days.

(21) Appl. No.: 12/503,150

(22) Filed: Jul. 15, 2009

(65) Prior Publication Data

US 2010/0015429 A1 Jan. 21, 2010

Related U.S. Application Data

(60) Provisional application No. 61/081,271, filed on Jul. 16, 2008.

(51) Int. Cl.
| | | |
|---|---|---|
| *B32B 18/00* | (2006.01) | |
| *B32B 27/32* | (2006.01) | |
| *B32B 3/00* | (2006.01) | |
| *B32B 9/00* | (2006.01) | |
| *B32B 19/00* | (2006.01) | |
| *C23C 24/00* | (2006.01) | |
| *F28F 21/08* | (2006.01) | |

(52) U.S. Cl.
CPC .............. *C23C 24/00* (2013.01); *F28F 21/089* (2013.01)
USPC ........... 428/697; 428/210; 428/216; 428/220; 428/315.7; 428/701; 428/702

(58) Field of Classification Search
CPC ........ C23C 22/78; C23C 22/80; C23C 24/00; F28F 21/089; F28F 21/083; C01P 2006/16; C01P 2006/17
USPC .............. 428/210, 216, 220, 315.7, 697, 701, 428/702
See application file for complete search history.

(56) References Cited

U.S. PATENT DOCUMENTS

| | | | |
|---|---|---|---|
| 4,775,588 | A | 10/1988 | Ishii et al. |
| 6,042,994 | A | 3/2000 | Yang et al. |
| 6,285,816 | B1 | 9/2001 | Anderson et al. |
| 6,318,124 | B1 | 11/2001 | Rutherford et al. |
| 6,787,198 | B2 | 9/2004 | Mukherjee et al. |
| 6,890,409 | B2 | 5/2005 | Woudenberg et al. |
| 7,029,826 | B2 | 4/2006 | Hacker et al. |
| 7,061,009 | B2 | 6/2006 | Nelles et al. |
| 7,112,617 | B2 | 9/2006 | Kim et al. |

(Continued)

OTHER PUBLICATIONS

Ha et al. ("Photocatalytic Degradation of Formic Acid via Metal Supported Titania", Journal of Environmental Engineering, vol. 122, 1996, pp. 217-221.*

(Continued)

*Primary Examiner* — Jonathan Langman
(74) *Attorney, Agent, or Firm* — Armstrong Teasdale LLP

(57) ABSTRACT

The present disclosure is directed to a metal-containing apparatus including a substrate member constructed of a metal that is highly resistant to pitting corrosion and wear in aggressive media. An exemplary metal-containing apparatus is a plate heat exchanger. The metal includes an oxidation layer on the surface thereof and a thin metal oxide nanoporous film on top of the oxidation layer. The nanoporous film is highly compliant and is comprised of oxygen and aluminum, titanium, silicon, zirconium and combinations thereof.

20 Claims, 8 Drawing Sheets

(56) References Cited

U.S. PATENT DOCUMENTS

| | | | |
|---|---|---|---|
| 7,122,106 | B2 | 10/2006 | Lin et al. |
| 7,259,381 | B2 | 8/2007 | Liu et al. |
| 7,282,241 | B2 | 10/2007 | Kim et al. |
| 7,323,635 | B2 | 1/2008 | Chittibabu et al. |
| 7,357,852 | B2 | 4/2008 | Woudenberg et al. |
| 7,410,762 | B1 | 8/2008 | Huo et al. |
| 7,439,055 | B1 | 10/2008 | Huo et al. |
| 7,531,120 | B2 | 5/2009 | Van Rijn et al. |
| 7,547,643 | B2 | 6/2009 | Schmitt et al. |
| 7,557,035 | B1 | 7/2009 | Ryan et al. |
| 2002/0004102 | A1* | 1/2002 | Park et al. ............... 427/327 |
| 2003/0056821 | A1 | 3/2003 | Chittibabu et al. |
| 2003/0062082 | A1 | 4/2003 | Miteva et al. |
| 2003/0067000 | A1 | 4/2003 | Nelles et al. |
| 2003/0075445 | A1 | 4/2003 | Woudenberg et al. |
| 2003/0157250 | A1 | 8/2003 | Mukherjee et al. |
| 2003/0217928 | A1 | 11/2003 | Lin et al. |
| 2004/0013858 | A1 | 1/2004 | Hacker et al. |
| 2004/0028875 | A1 | 2/2004 | Van Rijn et al. |
| 2004/0194821 | A1 | 10/2004 | Chittibabu et al. |
| 2004/0213986 | A1 | 10/2004 | Kim et al. |
| 2004/0214110 | A1 | 10/2004 | Kim et al. |
| 2005/0061669 | A1 | 3/2005 | Woudenberg et al. |
| 2005/0227502 | A1 | 10/2005 | Schmitt et al. |
| 2005/0233591 | A1 | 10/2005 | Schmitt et al. |
| 2006/0021879 | A1 | 2/2006 | Lin et al. |
| 2006/0027764 | A1 | 2/2006 | Liu et al. |
| 2006/0078827 | A1 | 4/2006 | Hacker et al. |
| 2006/0174936 | A1 | 8/2006 | Di Palma et al. |
| 2006/0174938 | A1 | 8/2006 | Di Palma et al. |
| 2006/0191102 | A1* | 8/2006 | Hayes et al. ............... 16/108 |
| 2007/0190735 | A1 | 8/2007 | Hacker et al. |
| 2007/0231559 | A1 | 10/2007 | Kim et al. |
| 2007/0240761 | A1 | 10/2007 | Miteva et al. |
| 2008/0105978 | A1 | 5/2008 | Schmitt et al. |
| 2008/0107573 | A1 | 5/2008 | Schmitt et al. |
| 2009/0054230 | A1 | 2/2009 | Veeraraghavan et al. |

OTHER PUBLICATIONS

Czerwinski et al. "Optimizing properties of CeO2 sol-gel coatings for protection of metallic substrates against high temperature oxidation", Thin Solid Films, vol. 289, 1996, pp. 213-219.*

Patil et al. "Nanocrystalline Ceria imparts better high temperature protection", Proc. R. Soc. Lond. A, 2004, vol. 460, pp. 3569-3587.*

Mehner et al., "Crystallization and residual stress formation of sol gel derived Zirconia films", Thin Solid Films, vol. 308-309, 1997, pp. 363-368.*

International Search Report and Written Opinion regarding PCT/US09/50698, dated Sep. 15, 2009.

* cited by examiner

METAL SUBSTRATES INCLUDING METAL OXIDE NANOPOROUS THIN FILMS AND METHODS OF MAKING THE SAME

CROSS REFERENCE TO RELATED APPLICATIONS

This patent application claims priority to U.S. Provisional Patent Application Ser. No. 61/081,271, which was filed on Jul. 16, 2008, the entirety of which is hereby incorporated by reference.

BACKGROUND OF THE INVENTION

The present disclosure is directed to highly corrosion and wear-resistant metal substrates having an oxidized surface layer having chemically bonded thereto a nanoporous thin film. More particularly, the present disclosure is directed to highly corrosion and wear-resistant metal substrates, such as stainless steel, carbon steel, or aluminum, that have an oxidized surface and a metal oxide nanoporous thin film layer chemically bonded to the oxidized surface that is prepared from a nanoparticulate sol of titanium dioxide, silicon dioxide, zirconium dioxide, alumina or a combination thereof. The present disclosure is also directed at various methods for preparing the highly corrosion and wear-resistant metal substrates including the metal oxide nanoporous thin film.

In many applications that utilize metal substrates that are in contact with aggressive media such as corrosive liquids, the metal substrates can quickly become corroded and worn. One specific example of a metal substrate that can quickly become corroded and worn during normal usage is a metal plate heat exchanger. Metal plate heat exchangers are commonly constructed of stainless steel, although in applications where salt and chlorides are present, more expensive materials such as titanium or stainless steel alloys such as 254 SMO® may be utilized. More aggressive media such as sulfuric acid and the like may require special alloys. Generally, a stainless steel heat exchanger will have a life expectancy of less than about five years in many applications, and may be less than one year in particularly corrosive applications.

The amount of corrosion and wear on a metal substrate, such as a metal plate heat exchanger, shell and tube heat exchangers, or cooling towers, for example, is directly dependent upon three variables: (1) the metal comprising the metal substrate; (2) the surface roughness of the metal substrate prior to the application of any coating; and (3) the media that the metal substrate is exposed to. These variables need to be addressed and controlled in order to achieve the greatest life expectancy for the metal substrate during use.

As compared to other types of steel, stainless steel generally exhibits a lower corrosion rate in an aqueous environment due to the formation of a thin passivating oxide film that covers and protects the metal surface. Pitting corrosion occurs when passivity fails or is otherwise absent at localized points on the metal surface. Pitting corrosion is a particularly aggressive form of corrosion that is focused on a small area of the metal substrate. Pitting corrosion forms pits, which are holes formed on the metal surface. Pits tend to propagate very rapidly due to anodic dissolution of the metal. As such, pitting corrosion may be referred to as "localized." A common and important type of pitting corrosion occurs on passivated iron-based alloys in contact with halide-containing solutions. Chloride is a common and aggressive halide anion and causes pitting corrosion in many metals and alloys.

Generation of corrosion pits on stainless steel immersed in aggressive media, such as a chloride solution, generally occurs in three distinct stages: nucleation, metastable growth, and stable growth. Many pits that nucleate do not propagate indefinitely. Instead, many pits re-passivate after a very short period of metastable growth. Metastable pits generally do not cause significant damage to the metal surface. The final diameter of metastable pits may be a few micrometers.

Pit growth is generally sustained by the development of a highly aggressive analyte, which involves a strong oxidizing solution having an oxidizing reduction potential of +600 to +1200 mV inside of the pit. The analyte also comprises an enhanced concentration of anions that migrate into the pit, which maintains analytic charge neutrality. Pit growth is self-sustaining due at least in part to development of the aggressive analyte.

Most pits generally tend to continue growing once they have become established. Therefore, the susceptibility of a metal to pitting corrosion is linked to the formation of stable pits. The resistance of stainless steel to pitting generally relates to the critical potential measurable by various electrochemical methods. The potentiodynamic method involves an applied potential scanned to noble values, whereby the respective current is measured.

The potentiodynamic method provides a measurement of the pitting potential ($E_p$) related to pit nucleation. The potentiodynamic curves depend upon experimental variables, such as potential scanning rate. $E_p$ may be determined by extrapolating to the passive current density for the rising curve observed in the early stages of pitting. $E_p$ values may also be determined from the same curve by relating to a predetermined current density and to a current density ten times higher.

Another accelerated way of testing for pitting corrosion resistance with respect to a surrounding medium is to expose the coated stainless steel material to an aggressive corrosion medium of interest. Periodic visual examination of the material permits qualitative ranking with respect to pitting corrosion susceptibility. Although such testing is more time consuming than the electrochemical methods, it may provide improved evaluation of longevity in a medium of specific interest.

Based on the foregoing, there is a need in the art for metal substrates that are constructed out of lower cost materials that can provide increased resistance against pitting and corrosion and thus a longer service life.

SUMMARY OF THE INVENTION

The present disclosure provides metal substrates, such as metal plate heat exchangers and the like, that have significant resistance to pitting and corrosion in aggressive media and thus provide for extended use without failure. The metal substrates have an oxidized layer on the surface thereof and a very thin metal oxide nanoporous film chemically bonded to the oxidized layer. The nanoporous film is derived from a suspension containing nanoparticles (Sol) whereby the nanoparticles are comprised of oxygen and an element selected from the group consisting of aluminum, titanium, silicon, zirconium and combinations thereof. The nanoporous film has a thickness of less than about 1 micrometer and has a porosity of from about 26% to about 80%. In some embodiments of the present disclosure described herein, the metal substrate includes a first nanoporous film chemically bonded to the oxidized layer of the substrate and a second nanoporous film on top of the first nanoporous film. This first and second nanoporous film may be of the same or different composition.

The present disclosure also provides various methods for preparing a metal substrate including an oxidized layer on the surface thereof and a nanoporous film chemically bonded to the oxidized layer.

As such, one embodiment of the present disclosure is directed to a metal-containing apparatus comprising a substrate member constructed of a metal, an oxidized layer on a surface of the substrate member, and a first nanoporous film comprising oxygen and an element selected from the group consisting of aluminum, titanium, silicon, zirconium and combinations thereof, the nanoporous film being chemically bonded to the oxidized layer, the nanoporous film having a thickness of less than about 1 micrometer and having a porosity of from about 26% to about 80%.

In another embodiment the present disclosure is directed to a method of making a metal-containing apparatus, the method comprising: (1) providing a substrate material constructed of a metal; (2) introducing an oxidized layer on a surface of the substrate material, the oxidized layer having a thickness of less than about 200 nanometers; (3) providing a sol comprising nanoparticulate γ-AlOOH, $TiO_2$, $SiO_2$, $ZrO_2$, or a mixture thereof, the nanoparticulates having a primary particle size of from about 1.5 nanometers to about 50 nanometers; (4) contacting the sol with the oxidized layer to provide at least one layer of the sol onto the oxidized layer; (5) heating the at least one layer at a temperature of from about 60° C. to about 100° C. for a time period of from about 15 minutes to about 2 hours to produce at least one dry layer; and (6) thermally sintering the at least one dry layer to produce a nanoporous film comprising oxygen and aluminum, titanium, silicon, zirconium or a combination thereof, the nanoporous film having a thickness of less than about 1 micrometer and a porosity of from about 26% to about 80%.

DETAILED DESCRIPTION OF THE EMBODIMENTS

Figure 1:
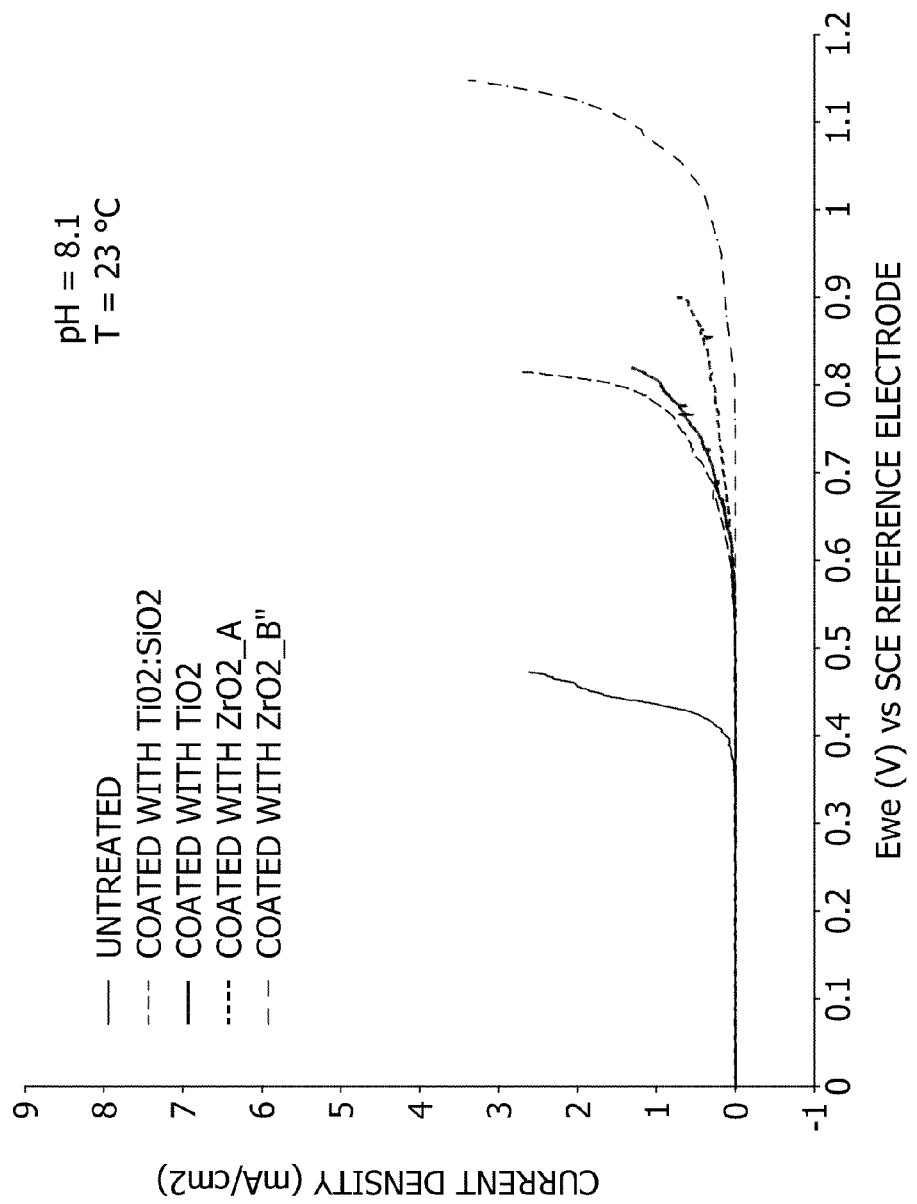
FIG. 1 is a graph showing the pitting potential of various Stainless Steel 316 Coupons (B2 Finish) immersed in an Instant Ocean Solution.

The present disclosure is directed to a metal-containing apparatus, such as a plate heat exchanger and the like, that are highly corrosion and wear resistant in aggressive media. The metal-containing apparatus includes a substrate member constructed of a metal that has an oxidation layer on a surface thereof and a thin, metal oxide nanoporous film chemically bonded to the oxidation layer. The nanoporous film is formed from a nanoparticulate sol and includes oxygen and an element selected from the group consisting of aluminum, titanium, silicon, zirconium and combinations thereof. The nanoporous film has a thickness of less than about 1 micrometer and has a porosity of from about 26% to about 80%. Surprisingly, it has been discovered that a thin, porous film as described herein can be utilized on the metal substrate to significantly improve corrosion and pitting performance and increase overall wear of the apparatus. Before the unexpected discovery described herein, it was thought that these types of films needed to be thicker, non-porous films such that there would not be any discontinuous areas in the film and the film would not allow aggressive media to pass through and contact the metal. Surprisingly, the nanoporous films described herein provide a number of benefits while being thin and porous, and thus highly resistant to cracking and/or fracturing.

As noted above, the nanoporous films described herein are applied to a metal-containing apparatus including a substrate member constructed of a metal. The metal-containing apparatus can be any metal containing apparatus that is subjected to aggressive media during use and may be subject to corrosion, pitting, and wear due to the aggressive media. The substrate member constructed of a metal can have any thickness suitable for its intended use. In one embodiment, a metal substrate useful in a plate heat exchanger has a thickness of from about 0.1 millimeters to about 100 millimeters, or even 0.1 millimeters to about 10 millimeters, or even 0.1 millimeters to about 1 millimeter. Specific, non-limiting examples of metal-containing apparatuses include plate heat exchangers, shell and tube heat exchangers, cooling towers, and the like. The metal substrate utilized in the metal-containing apparatus can be any metal that is subject to corrosion in aggressive media including, for example, stainless steel (e.g., 100 series, 200 series, 300 series, 400 series, 500 series, 600 series stainless steel, a 2205 stainless steel, a 304 stainless steel, and a 316 stainless steel), carbon steel, reinforcing rebars, and aluminum. In some embodiments, it is preferred that the surface roughness of the metal substrate utilized in the metal-containing apparatus be minimized in order to improve adhesion of the oxidized layer and metal oxide nanoporous film.

The metal substrate described above includes an oxidized layer on a surface thereof in accordance with the present disclosure. The oxidized layer present on a surface of the metal generally has a thickness of less than about 200 nanometers, and generally less than about 100 nanometers.

The oxidation layer is introduced onto a surface of the metal substrate used in the metal-containing apparatus to improve the bonding of the nanoporous film described herein to the metal substrate. It has been observed that in the absence of the deposited oxidation layer, the "bare" metal surface does not "wet" well with the nanoparticulate sol utilized to deposit the nanoporous film and the resulting nanoporous film quality is non-uniform and poor.

The metal substrate additionally includes one or more metal oxide nanoporous films on top of the oxidation layer. As described more fully below, the nanoporous film is preferably compliant with respect to bending, twisting, and stretching of the substrate and is uniform in nature and is introduced directly on top of the oxidation layer and results in the nanoporous film being chemically bonded to the oxidation layer. Once the first nanoporous film is introduced directly on top of the oxidation layer, one or more additional nanoporous films may be introduced on top of the first nanoporous film such that the metal substrate may include one nanoporous film on top of the oxidation layer, two nanoporous films on top of the oxidation layer, three nanoporous films on top of the oxidation layer, etc. If more than one nanoporous film is present on the metal substrate, the nanoporous films may be of identical construction, or may be of different constructions. In addition, each film in itself could contain a single type of metal oxide or multiple metal oxides.

The nanoporous film comprises oxygen and an element selected from the group consisting of aluminum, titanium, silicon, zirconium and combinations thereof. By way of non-limiting example, the nanoporous film may comprise (1) aluminum and oxygen; (2) titanium and oxygen; (3) silicon and oxygen; (4) zirconium and oxygen; (5) silicon, titanium and oxygen; (6) aluminum, zirconium, and oxygen; or (7) aluminum, silicon, and oxygen and so forth. The nanoporous film generally has a thickness of less than about 1 micrometer, and in one embodiment may be from about 0.01 micrometers to about 1 micrometer. In another specific embodiment, the nanoporous film has a thickness of from about 200 nanometers to about 300 nanometers. In another specific embodiment, the nanoporous film has a thickness of from about 0.01 micrometers to about 100 nanometers. Nanoporous films greater than 1 micrometer in thickness tend to begin to take on thermo-mechanical properties of expansion and contraction, which are generally undesirable. As such, these thicker films tend to crack and fracture during use. This cracking and fracturing can lead to pitting corrosion.

The nanoporous film generally has a porosity of from about 26% to about 80% and, in some embodiments, has a porosity of about 26%. The porosity of the nanoporous films depend upon the particle size of the nanoparticulates making up the film, the packing of the particles in the film, the chemical identity of the metal oxide particle, and the sintering temperature.

In accordance with the present disclosure, methods of preparing the metal-containing apparatus are also disclosed. In one embodiment, the metal-containing apparatus is prepared by introducing an oxidized layer onto a surface of a substrate member constructed of a metal that will be incorporated into the metal-containing apparatus. The oxidation layer on the metal substrate can be applied using a "dry oxidation" process or "wet oxidation" process. Although not required in every embodiment of the present disclosure, it is generally desirable that the surface of the substrate member constructed of a metal be cleaned/degreased prior to the growth of the oxidation layer. One suitable method for cleaning/degreasing the metal surface is by using soap and water to remove any grease/organic material from the surface onto which the oxidation will be introduced.

The "dry oxidation" process can be done by heating the metal substrate in air at a temperature of from about 200° C. to about 400° C. for a time period sufficient to grow the oxidation layer to a desired thickness. In one specific embodiment, the metal substrate may be heated in air to a temperature of 300° C. at a rate of about 10° C. per minute and maintained at the 300° C. temperature for about two hours. The metal substrate is then cooled to room temperature.

A "wet oxidation" process may also be used to provide the desired oxidation layer on the substrate member constructed of a metal. A basic solution such as sodium hydroxide or a solution of hydrogen peroxide may be used to provide the desired oxidation layer. The metal substrate is generally held in the solution for a period of from about one hour to about four hours. In one specific embodiment, the metal substrate is immersed in a 6% hydrogen peroxide solution having a pH of about 13 (0.1 M NaOH) for about three hours. The metal substrate is then washed with MQ water to provide the desired oxidation layer.

Once the desired oxidation layer has been introduced onto a surface of the substrate member constructed of a metal, a sol comprising nanoparticulate γ-AlOOH, $TiO_2$, $SiO_2$, $ZrO_2$, or a mixture thereof is contacted with the oxidized substrate member constructed of a metal. The nanoparticles included in the sol generally have a particle size of from about 1.5 nanometers to about 50 nanometers, or even 1.5 nanometers to about 20 nanometers, or even 1.5 nanometers to about 10 nanometers. In one specific embodiment, the nanoporous films described herein are prepared from a sol comprising nanoparticulate $TiO_2$ having a primary particle size of from about 3 nanometers to about 8 nanometers. In another specific embodiment, the nanoporous films described herein are prepared from a sol comprising nanoparticulate $SiO_2$ having a primary particle size of from about 1.5 nanometers to about 8 nanometers. In another specific embodiment, the nanoporous films described herein are prepared from a sol comprising nanoparticulate $ZrO_2$ having a primary particle size of from about 3 nanometers to about 8 nanometers. In another specific embodiment, the nanoporous films described herein are prepared from a sol comprising nanoparticulate $SiO_2$ having a primary particle size of from about 1.5 nanometers to about 8 nanometers and nanoparticulate $TiO_2$ having a primary particle size of from about 3 nanometers to about 8 nanometers.

In accordance with the present disclosure, the sols utilized to introduce the nanoporous films onto the oxidized layer may be prepared by any suitable process known in the art. In one specific embodiment, a sol comprising $SiO_2$ nanoparticulates may be prepared using tetraethyl orthosilicate which is hydrolyzed in an ammonia based solution (such as, for example, a 0.5M solution) with stirring for about one hour. The resulting sol may then be aged for about 24 hours at which time larger particles or precipitates can be removed by filtration. A hydroxide solution may then be added with stirring to produce a sol having a concentration of $SiO_2$ of 30 g/L.

In another specific embodiment, a sol comprising $TiO_2$ nanoparticulates may be prepared by hydrolysis of titanium isopropoxide in a nitric acid solution. A suitable solution may be 1.43 mL of concentrated nitric acid in 200 mL of water and 33 mL of $Ti(OPR)_4$. A white precipitate forms under stirring and the resulting aqueous phase becomes transparent due to peptization (the breaking or electrostatic segregation of larger particles into smaller ones) under strong stirring. The resulting suspension becomes a transparent sol, which may be placed in dialysis tubing and dialyzed against pure MQ water to adjust the pH to about 3.5. The resulting sol has a solids concentration of about 25 g/L.

In another specific embodiment, a sol comprising $ZrO_2$ nanoparticulates may be prepared by the hydrolysis of zirconium propoxide in nitric acid. A suitable mixture is 3 mL of concentrated nitric acid in 150 mL of water and 11 mL of $Zr(OPr)_4$. After one day of strong stirring, a white suspension forms upon mixing of the propoxide, and the aqueous phase becomes transparent due to peptization. The transparent sol may then be dialyzed in MQ water until a pH of about 3.2 is reached. The resulting solids content is about 12 g/L.

In another specific embodiment, a sol comprising $SiO_2$ nanoparticulates and $TiO_2$ nanoparticulates is prepared wherein the silica and titania sol mixture is in a weight percentage of 70% $SiO_2$ and 30% $TiO_2$.

The contacting of the sol with the oxidized layer on the substrate member constructed of a metal to produce a wet layer of sol on the oxidized layer may be accomplished by any manner suitable in the art. For example, the sol may be contacted with the oxidized layer utilizing a process selected from the group consisting of dipping, draining, spraying, electro-deposition, spinning, and combinations thereof. The thickness of the resulting nanoporous film on top of the oxidized layer may generally be controlled by the amount of time the oxidized layer is exposed to the contacting process and the concentration of particles in the suspension. For example, if a dipping or dip coating process is utilized as the contacting procedure, the thickness of the resulting nanoporous film can be controlled by the rate at which the substrate member constructed of a metal is withdrawn from the dip chamber containing a given concentration of particles in the sol. Similarly, if a spraying process is utilized as the contacting procedure, the thickness of the resulting nanoporous film can be controlled by the amount of suspension delivered, the concentration of particles in the suspension, and the duration of the spraying of the sol onto the oxidized surface of the substrate member constructed of a metal.

It will be recognized by one skilled in the art based on the disclosure herein that the substrate member constructed of a metal may be contacted with the sol one time, two times, three times, four times, or more depending on the desired end result. For example, if a dipping process is being utilized, the substrate member constructed of a metal and having an oxidized surface layer may be dipped into a sol one or more times and may have a drying process as described herein utilized between dips such that multiple nanoporous films or layers are introduced onto the substrate.

After the sol has been contacted with the oxidized layer on the substrate member constructed of a metal to form a wet sol layer on the oxidized surface, the resulting substrate member is then heated at a temperature of from about 60° C. to about 100° C. for a time period of from about 15 minutes to about 2 hours to produce a dry metal oxide nanoporous film on top of the oxidized layer. In some embodiments, it may not be necessary to dry at an elevated temperature and room temperature may be utilized for drying (for a period of a one minute or a few minutes to a few hours). Once a dry nanoporous film has been formed on top of the oxidized layer, the substrate member constructed of a metal may be subjected to a process for depositing another wet layer of sol on the surface of the dry nanoporous film which is then subjected to the drying process described above. This will result in a second nanoporous film on the surface of the substrate member constructed of a metal. The substrate member constructed of a metal may ultimately have one, two, three, four or even more nanoporous film layers on top of the oxidized layer. These nanoporous film layers may be constructed of the same metal oxides, or may be constructed of different metal oxides.

Figure 8:
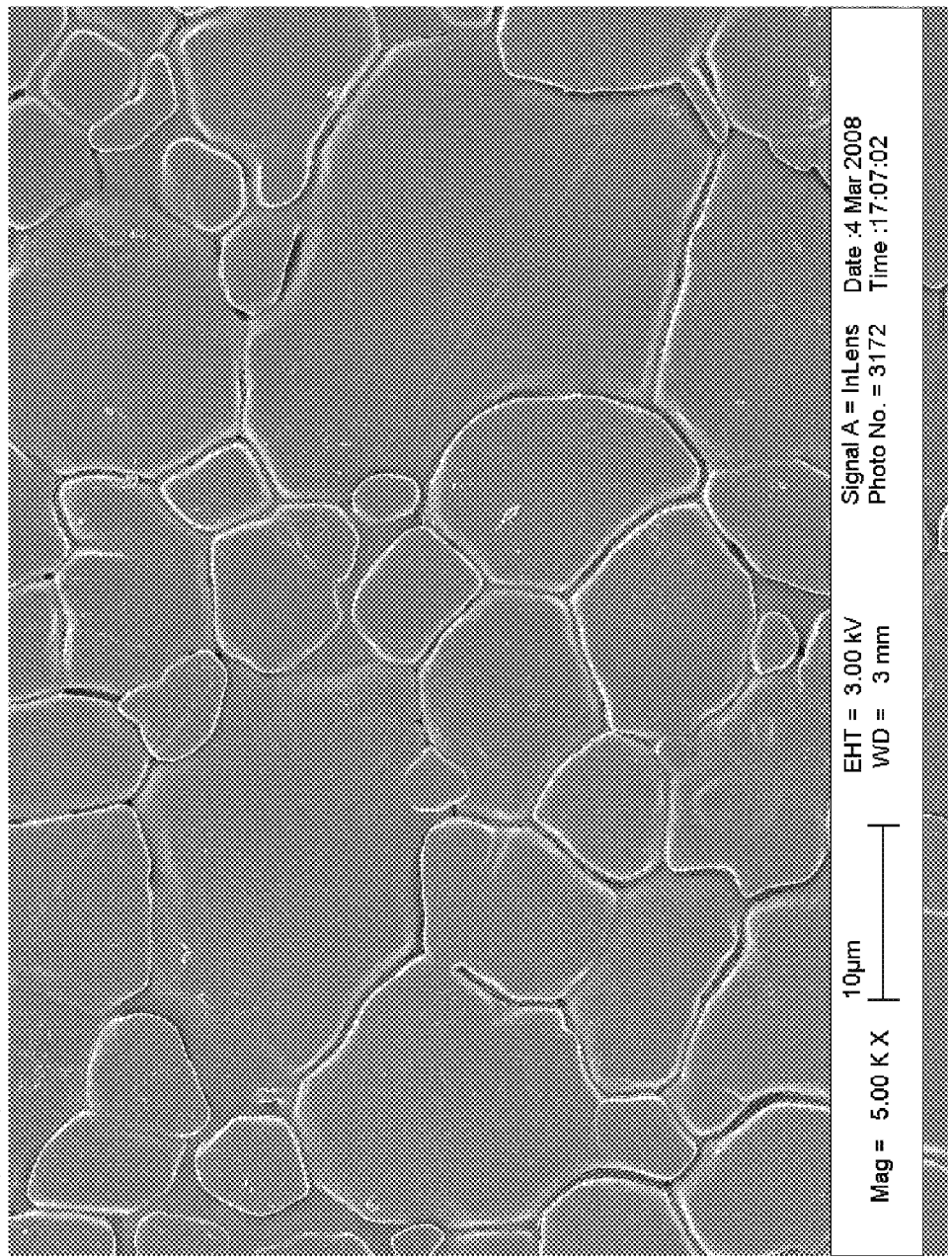
FIG. 8 is a scanning electron microscopy picture (SEM) of 316 stainless steel dip-coated with three layers of a sol comprising nanoparticulate $TiO_2$ (magnification of 5.00 K X), whereby each wet sol layer was dried at 100° C. for 30 minutes and whereby the three layers were sintered at 300° C. for one hour.

After the one or more dried nanoporous film(s) has been introduced onto the oxidized layer of the substrate member constructed of a metal, the substrate member is then thermally sintered to produce a nanoporous film(s) comprising oxygen and aluminum, titanium, silicon, zirconium or a combination thereof. The sintering may be carried out at a temperature of from about 100° C. to about 500° C., generally from about 200° C. to about 400° C., or even 250° C. to about 350° C. for a time period of from about 30 minutes to about 3 hours. In one specific embodiment, the upper limit of the firing temperature is just under the melting point of the substrate. Referring now to FIG. 8, there is shown a scanning electron microscopy picture of a 316 stainless steel coupon dip-coated, dried and sintered in accordance with the present disclosure.

During the sintering process, there may be some elemental/ atomic diffusion between the metal oxide layer and the components of the underlying metal. For example, iron, nickel, chromium and/or cobalt may diffuse from the underlying metal, such as stainless steel, into the metal oxide layer, which may change the sintering properties of the nanoporous films. In particular, etching may occur at higher temperatures, whereby the iron, nickel, chromium, and/or cobalt are inserted into the lattice structure of the nanoparticulate metal oxide particles.

With increased sintering temperatures, the nanoporous films decrease in surface area and porosity whereas the pore size increases due to the migration of material from the pore surface to the interparticle space to make a neck between particles. Some of the small pores are being filled during this process, and thus the pore size distribution moves towards larger pores. As a result, the density of the nanoporous films increases with sintering. Ellipsometry testing may be used to determine the density of the nanoporous films.

In one exemplary process of the present disclosure, a plate heat exchanger is fabricated by the following steps: (1) providing a substrate member constructed from stainless steel; (2) oxidizing a layer of the stainless on the surface of the substrate member, the oxidized layer having a thickness less than about 200 nanometers; (3) providing a sol comprising nanoparticulate γ-AlOOH, $TiO_2$, $SiO_2$, $ZrO_2$ or a mixture thereof, the nanoparticles having a primary particle size of from about 1.5 nanometers to about 50 nanometers; (4) dip coating one or more wet layers of the sol onto the oxidized layer; (5) heating the wet layer(s) at a temperature of from about 60° C. to about 100° C. for a time period of from about 15 minutes to about 2 hours to make a dry layer; and (6) thermally sintering the dry layer to make a nanoporous film comprising oxygen and Al, Ti, Si, Zr or a combination thereof, the film being chemically bonded to the oxidized layer on the surface of the substrate member, and the film having a thickness of less than about 1 micrometer and having a porosity of from about 26% to about 80%.

EXAMPLES

Example 1

Electrochemical testing and evaluation for pitting potential of stainless steel 316 coupons (B2 finish) immersed in sea water (Instant Ocean Solution) was conducted. The stainless steel 316 coupons (B2 finish) had various surface coatings thereon as set forth below. Each coupon tested was a square plate of either 1 inch by two inches or one inch by four inches.

The stainless steel 316 (B2 finish) coupons evaluated were as follows: (1) untreated; (2) surface treated with a dry oxidation procedure plus a coating of $TiO_2$ (70%) and $SiO_2$ (30%) (3) surface treated with a dry oxidation procedure plus a coating of $TiO_2$; (4) surface treated with a dry oxidation procedure plus a coating of $ZrO_2$ ("A"); and (5) surface treated with a dry oxidation procedure plus a coating of $ZrO_2$ ("B").

For the coupons treated with a dry oxidation step, the following procedure was used. The stainless steel coupon was heated to 200° C. at a rate of 10° C. per minute in air. The coupon was held at this temperature for 1 hour and subsequently cooled to room temperature. This resulted in an oxidation layer having a thickness of about 100 nanometers.

The preparation of the $TiO_2$ sol was done by hydrolysis of titanium isopropoxide in a nitric acid solution including 1.43 mL of concentrated nitric acid in 200 mL of water and 33 mL of $Ti(OPR)_4$. A white precipitate was obtained upon mixing the $Ti(OPr)_4$ with the aqueous phase becoming transparent due to peptization under strong stirring of the suspension. The suspension became a transparent sol, and the sol was placed in a Spectra/Por dialysis tubing and dialyzed against pure water (MQ) to slowly adjust the pH to 3.5. The solids concentration was about 25 g/L.

The preparation of the $ZrO_2$ sol was done by the hydrolysis of Zr propoxide in a nitric acid solution including 3 mL of concentrated nitric acid in 150 mL of water and 11 mL of $Zr(OPr)_4$. After one day of strong stirring, a white suspension formed upon mixing the propoxide, and the aqueous phase became transparent due to peptization. The transparent sol was then dialyzed in MQ water until a pH of 3.2 was obtained. The solids concentration was about 12 g/L.

The preparation of the $SiO_2$ sol was done by using tetraethyl orthosilicate which was hydrolyzed in an ammonia based solution (0.5M) by stirring one hour at room temperature. The sol was then aged for 24 hours, and the larger particles or precipitates were removed by filtration. A hydroxide solution was then added with stirring. The concentration $SiO_2$ was 30 g/L.

The preparation of the $TiO_2/SiO_2$ was done by mixing the sols in a weight ratio of 70% $TiO_2$ and 30% $SiO_2$.

Dip coating was performed on the coupons (with the exception of the untreated coupon) to introduce the nanoporous film onto the oxidized layer. Each coupon was dip coated into the desired sol and withdrawn at a speed of about 3 millimeters per second. Once removed from the dip coating chamber, each coupon was dried at 100° C. for about 30 minutes and then cooled to room temperature in air. After the drying of the nanoporous coating was complete, each coated coupon was subjected to a sintering step that included heating the coupon at 10° C. per minute to 300° C. and then dwelled at 300° C. for 1 hour and then cooled to room temperature in air. This process resulted in a nanoporous film having a thickness of between about 200 nanometers and about 300 nanometers.

Anodic Polarization Measurements: Localized corrosion resistance was measured for each of the five coupons described above. The tests were done in aerated solutions at a temperature of 23° C. and a pH of 8.1.

The elements of the electrochemical cell included the following: a surrogate sea water solution ("Instant Ocean") saturated with oxygen; temperature of 23° C.; V=300 mL; a Calomel Reference electrode; and a Pt Counter Electrode=Pt. The working electrode was the coupon being evaluated. The tested area of the working electrode was 18 $cm^2$. About 3 centimeters of the working electrode was immersed into the sea water solution. 300 mL of sea water solution was added to the cell, and the electrodes inserted into the sea water solution.

Once the electrochemical cell setup was complete, the potentiostat started registering the open circuit potential (OCV) of the system. After approximately 1.5 hours of exposing the working electrode to the sea water solution, the OCV became quasi-constant for the coupons. The potential was then increased at a constant rate of 150 mV/s until the current density reached I=3 $mA/cm^2$ or until the potential reached 0.9 mV.

Referring now to FIG. 1, there is shown CV curves for each of the coupons evaluated. FIG. 1 shows that the pitting potential (i.e., a sharp increase in the current density) is dependent upon the presence or absence of the nanoporous submicron metal oxide film as described herein. The untreated coupon incurred a sharp increase in current density of around 0.4 V. In contrast, the coupons having a nanoporous coating as described herein incurred a sharp increase in current density no less than about 0.6 V and as much as 1.1 V. The curve increase associated with the coupons having a nanoporous coating is not as sharp as the curve for the uncoated coupon.

For the coupons having the nanoporous coating, the gradual increase in potential is theoretically associated with nucleation of pits and formation of metastable pits. The sharp/spike increase in potential is theoretically associated with the growth of stable pits.

Visual inspection of the coated and uncoated coupons after the sharp increase in current revealed the existence of some pits. As such, the increase in current density was associated with pitting and not with the transpassive potential of the uncoated substrate metal. Transpassive potential is associated with the point in time when general dissolution of the passivated layer occurs.

In conclusion, sintered nanoporous, sub-micron thin films derived from dip-coated liquid sols comprising the various metal oxides or mixtures of metal oxides provided significant protection from pitting as compared to untreated coupons.

Example 2

Electrochemical testing and evaluation for pitting potential of stainless steel 304 coupons (B2 finish) immersed in sea water (Instant Ocean Solution) was conducted. The stainless steel 304 coupons (B2 finish) had various surface coatings thereon as set forth below. Each coupon tested was a square plate of either 1 inch by two inches or one inch by four inches.

The stainless steel 304 (B2 finish) coupons evaluated were as follows: (1) untreated; (2) surface treated with a dry oxidation procedure plus a coating of $ZrO_2$; surface treated with a dry oxidation procedure plus a coating of $TiO_2$; (4) surface treated with a dry oxidation procedure plus a coating of $TiO_2$ (70%) and $SiO_2$ (30%).

For the coupons treated with a dry oxidation step, the following procedure was used. The stainless steel coupon was heated to 200° C. at a rate of 10° C. per minute in air. The coupon was held at this temperature for 1 hour and subsequently cooled to room temperature. This resulted in an oxidation layer having a thickness of about 100 nanometers.

The preparation of the $TiO_2$ sol was done by hydrolysis of titanium isopropoxide in a nitric acid solution including 1.43 mL of concentrated nitric acid in 200 mL of water and 33 mL of $Ti(OPR)_4$. A white precipitate was obtained upon mixing the $Ti(OPr)_4$ with the aqueous phase becoming transparent due to peptization under strong stirring of the suspension. The suspension became a transparent sol, and the sol was placed in a Spectra/Por dialysis tubing and dialyzed against pure water (MQ) to slowly adjust the pH to 3.5. The solids concentration was about 25 g/L.

The preparation of the $ZrO_2$ sol was done by the hydrolysis of Zr propoxide in a nitric acid solution including 3 mL of concentrated nitric acid in 150 mL of water and 11 mL of $Zr(OPr)_4$. After one day of strong stirring, a white suspension formed upon mixing the propoxide, and the aqueous phase became transparent due to peptization. The transparent sol was then dialyzed in MQ water until a pH of 3.2 was obtained. The solids concentration was about 12 g/L.

The preparation of the $SiO_2$ sol was done by using tetraethyl orthosilicate which was hydrolyzed in an ammonia based solution (0.5M) by stirring one hour at room temperature. The sol was then aged for 24 hours, and larger particles or precipitates were removed by filtration. A hydroxide solution was then added with stirring. The concentration $SiO_2$ was 30 g/L.

The preparation of the $TiO_2/SiO_2$ was done by mixing the sols in a weight ratio of 70% $TiO_2$ and 30% $SiO_2$.

Dip coating was performed on the coupons (with the exception of the untreated coupon) to introduce the nanoporous film onto the oxidized layer. Each coupon was dip coated into the desired sol and withdrawn at a speed of about 3 millimeters per second. Once removed from the dip coating chamber, each coupon was dried at 100° C. for about 30 minutes and then cooled to room temperature in air. After the drying of the nanoporous coating was complete, each coated coupon was subjected to a sintering step that included heating the coupon at 10° C. per minute to 300° C. and then dwelled at 300° C. for 1 hour and then cooled to room temperature in air. This process resulted in a nanoporous film having a thickness of between about 200 nanometers and about 300 nanometers.

Anodic Polarization Measurements: Localized corrosion resistance was measured for each of the five coupons described above. The tests were done in aerated solutions at a temperature of 23° C. and a pH of 8.1.

The elements of the electrochemical cell included the following: a surrogate sea water solution ("Instant Ocean") saturated with oxygen; temperature of 23° C.; V=300 mL; a Calomel Reference electrode; and a Pt Counter Electrode=Pt. The working electrode was the coupon being evaluated. The tested area of the working electrode was 18 cm$^2$. About 3 centimeters of the working electrode was immersed into the sea water solution. 300 mL of sea water solution was added to the cell, and the electrodes inserted into the sea water solution.

Once the electrochemical cell setup was complete, the potentiostat started registering the open circuit potential (OCV) of the system. After approximately 1.5 hours of exposing the working electrode to the sea water solution, the OCV became quasi-constant for the coupons. The potential was then increased at a constant rate of 150 mV/s until the current density reached I=3 mA/cm$^2$ or until the potential reached 0.9 mV.

Figure 2:
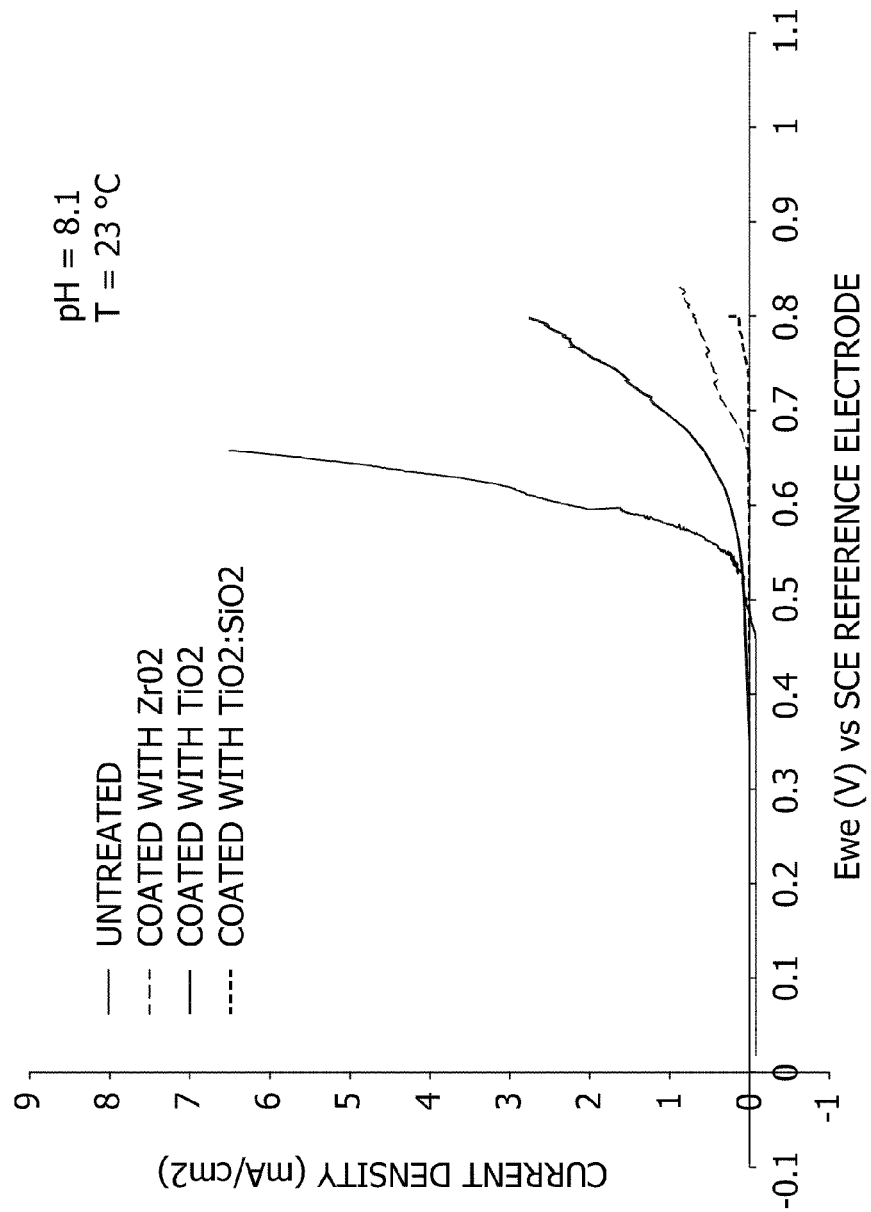
FIG. 2 is a graph showing the pitting potential of various Stainless Steel 304 Coupons (B2 Finish) immersed in an Instant Ocean Solution.

Referring now to FIG. 2, there is shown CV curves for each of the coupons evaluated. FIG. 2 shows that the pitting potential (i.e., a sharp increase in the current density) is dependent upon the presence or absence of the nanoporous submicron metal oxide film as described herein. The untreated coupon incurred a sharp increase in current density of around 0.52 V. In contrast, the coupons having a nanoporous coating as described herein incurred a sharp increase in current density no less than about 0.68 V and as much as 0.8 V. Furthermore, the curve increase associated with the coupons having a nanoporous coating is not as sharp as the curve for the uncoated coupon.

For the coupons having the nanoporous coating, the gradual increase in potential is theoretically associated with nucleation of pits and formation of metastable pits. The sharp/spike increase in potential is theoretically associated with the growth of stable pits.

Visual inspection of the coated and uncoated coupons after the sharp increase in current revealed the existence of some pits. As such, the increase in current density was associated with pitting and not with the transpassive potential of the uncoated substrate material. Transpassive potential is associated with the point in time when general dissolution of the passivated layer occurs.

In conclusion, sintered nanoporous, sub-micron thin films derived from dip-coated liquid sols comprising the various metal oxides or mixtures of metal oxides provided significant protection from pitting as compared to untreated coupons.

Example 3

Electrochemical testing and evaluation for pitting potential of carbon steel coupons (B2 finish) immersed in sea water (Instant Ocean Solution) was conducted. The carbon steel coupons (B2 finish) had various surface coatings thereon as set forth below. Each coupon tested was a square plate of either 1 inch by two inches or one inch by four inches.

The carbon steel (B2 finish) coupons evaluated were as follows: (1) untreated; (2) surface treated with a dry oxidation procedure plus a coating of $Al_2O_3$ (70%) and $ZrO_2$ (30%); and (3) surface treated with a dry oxidation procedure plus a coating of $Al_2O_3$.

For the coupons treated with a dry oxidation step, the following procedure was used. The stainless steel coupon was heated to 200° C. at a rate of 10° C. per minute in air. The coupon was held at this temperature for 1 hour and subsequently cooled to room temperature. This resulted in an oxidation layer having a thickness of about 100 nanometers.

The preparation of the $Al_2O_3$ sol was done by hydrolysis of aluminum isopropoxide in a nitric acid solution including 1.43 mL of concentrated nitric acid in 200 mL of water and 33 mL of $Al(OPR)_4$. A white precipitate was obtained upon mixing the $Al(OPr)_4$ with the aqueous phase becoming transparent due to peptization under strong stirring of the suspension. The suspension became a transparent sol, and the sol was placed in a Spectra/Por dialysis tubing and dialyzed against pure water (MQ) to slowly adjust the pH to 3.5. The solids concentration was about 25 g/L.

The preparation of the $ZrO_2$ sol was done by the hydrolysis of Zr propoxide in a nitric acid solution including 3 mL of concentrated nitric acid in 150 mL of water and 11 mL of $Zr(OPr)_4$. After one day of strong stirring, a white suspension formed upon mixing the propoxide, and the aqueous phase became transparent due to peptization. The transparent sol was then dialyzed in MQ water until a pH of 3.2 was obtained. The solids concentration was about 12 g/L.

Dip coating was performed on the coupons (with the exception of the untreated coupon) to introduce the nanoporous film onto the oxidized layer. Each coupon was dip coated into the desired sol and withdrawn at a speed of about 3 millimeters per second. Once removed from the dip coating chamber, each coupon was dried at 100° C. for about 30 minutes and then cooled to room temperature in air. After the drying of the nanoporous coating was complete, each coated coupon was subjected to a sintering step that included heating the coupon at 10° C. per minute to 300° C. and then dwelling (sometimes referred to as soaking) at 300° C. for 1 hour and then cooling to room temperature in air. This process resulted in a nanoporous film having a thickness of between about 200 nanometers and about 300 nanometers.

Anodic Polarization Measurements: Localized corrosion resistance was measured for each of the five coupons described above. The tests were done in aerated solutions at a temperature of 23° C. and a pH of 8.1.

The elements of the electrochemical cell included the following: a surrogate sea water solution ("Instant Ocean") saturated with oxygen; temperature of 23° C.; V=300 mL; a Calomel Reference electrode; and a Pt Counter Electrode=Pt. The working electrode was the coupon being evaluated. The tested area of the working electrode was 18 cm$^2$. About 3 centimeters of the working electrode was immersed into the sea water solution. 300 mL of sea water solution was added to the cell, and the electrodes inserted into the sea water solution.

Once the electrochemical cell setup was complete, the potentiostat started registering the open circuit potential (OCV) of the system. After approximately 1.5 hours of exposing the working electrode to the sea water solution, the OCV became quasi-constant for the coupons. The potential was then increased at a constant rate of 150 mV/s until the current density reached I=3 mA/cm² or until the potential reached 0.9 mV.

Figure 3:
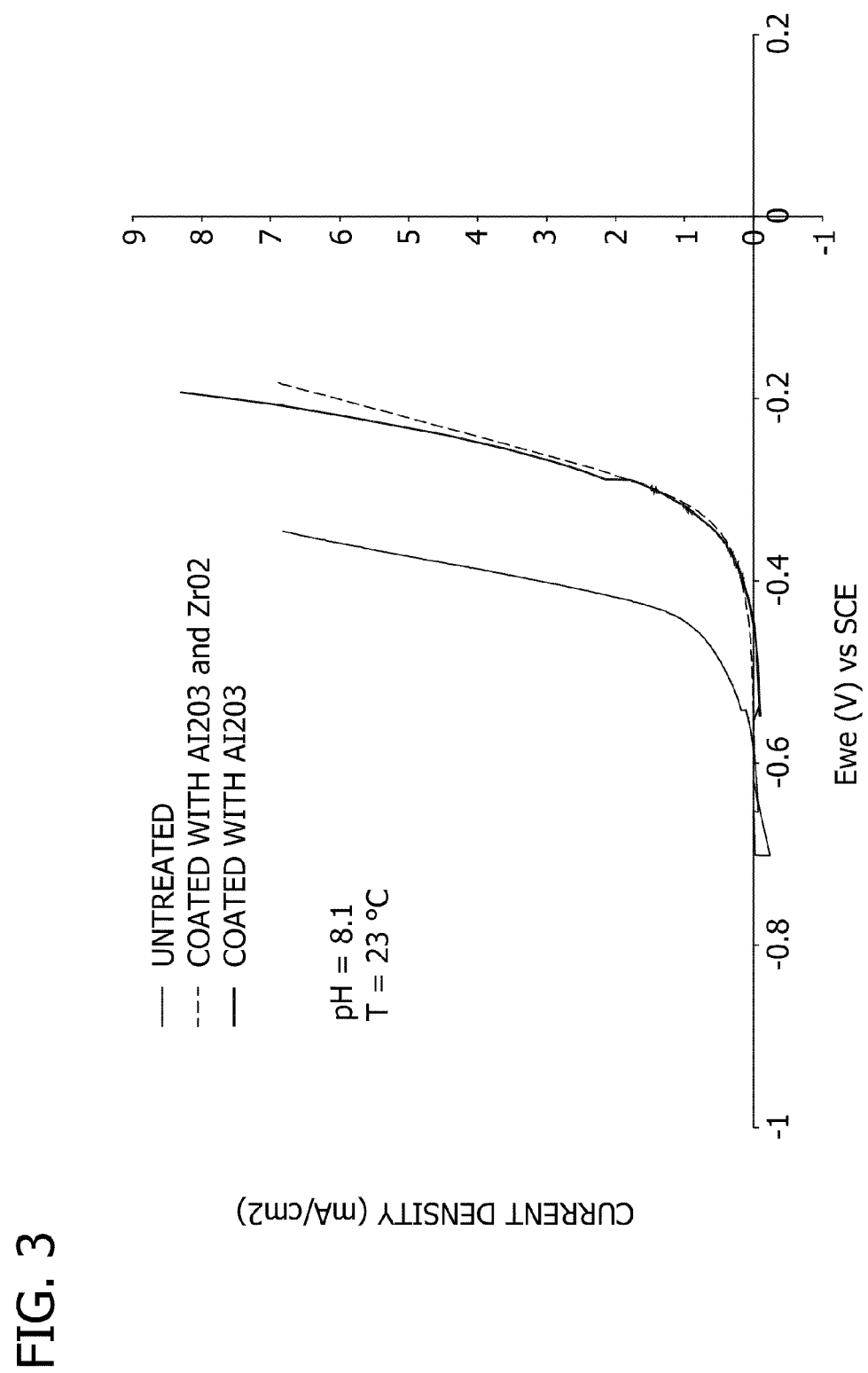
FIG. 3 is a graph showing the pitting potential of various Carbon Steel (B2 Finish) immersed in an Instant Ocean Solution.

Referring now to FIG. 3, there is shown CV curves for each of the coupons evaluated. FIG. 3 shows that the pitting potential (i.e., a sharp increase in the current density) is dependent upon the presence or absence of the nanoporous submicron metal oxide film as described herein. The untreated coupon incurred a sharp increase in current density of around −0.5 V. In contrast, the coupons having a nanoporous coating as described herein incurred a sharp increase in current density of about −0.35V.

For the coupons having the nanoporous coating, the gradual increase in potential is theoretically associated with nucleation of pits and formation of metastable pits. The sharp/spike increase in potential is theoretically associated with the growth of stable pits.

Visual inspection of the coated and uncoated coupons after the sharp increase in current revealed the existence of some pits. As such, the increase in current density was associated with pitting and not with the transpassive potential of the uncoated substrate material. Transpassive potential is associated with the point in time when general dissolution of the passivated layer occurs.

In conclusion, sintered nanoporous, sub-micron thin films derived from dip-coated liquid sols comprising the various metal oxides or mixtures of metal oxides provided significant protection from pitting as compared to untreated coupon.

Example 4

Electrochemical testing and evaluation for pitting potential of stainless steel 201 (brushed) coupons immersed in deaerated 1M NaCl solution (pH=5.5) was conducted. The stainless steel 201 (brushed) coupons had various surface coatings thereon as set forth below. Each coupon tested was a square plate of either 1 inch by two inches or one inch by four inches.

The stainless steel 201 (brushed) coupons evaluated were as follows: (1) surface treated with a wet oxidation procedure; and (2) surface treated with a wet oxidation procedure plus a coating of $ZrO_2$.

For the wet oxidation step, the following procedure was used. The stainless steel 201 (brushed) coupon was immersed for 1 hour in a basic (pH=13) solution of hydrogen peroxide (6%) and then removed, washed with MQ water, and dried at room temperature in air. This resulted in an oxidation layer having a thickness of about 100 nanometers.

The preparation of the $ZrO_2$ sol was done by the hydrolysis of Zr propoxide in a nitric acid solution including 3 mL of concentrated nitric acid in 150 mL of water and 11 mL of $Zr(OPr)_4$. After one day of strong stirring, a white suspension formed upon mixing the propoxide, and the aqueous phase became transparent due to peptization. The transparent sol was then dialyzed in MQ water until a pH of 3.2 was obtained. The solids concentration was about 12 g/L.

Dip coating was performed on the coupon to introduce the nanoporous film onto the oxidized layer. The coupon was dip coated into the $ZrO_2$ sol and withdrawn at a speed of about 3 millimeters per second. Once removed from the dip coating chamber, the coupon was dried at 100° C. for about 30 minutes and then cooled to room temperature in air. After the drying of the nanoporous coating was complete, the coated coupon was subjected to a sintering step that included heating the coupon at 10° C. per minute to 300° C. and then dwelled at 300° C. for 1 hour and then cooled to room temperature in air. This process resulted in a nanoporous film having a thickness of between about 200 nanometers and about 300 nanometers.

Anodic Polarization Measurements: Localized corrosion resistance was measured for both of the coupons described above. The tests were done in deaerated 1M NaCl solution at 23° C.

The elements of the electrochemical cell included the following: 1M NaCl deaerated solution; temperature of 23° C.; V=300 mL; a Calomel Reference electrode; and a Pt Counter Electrode=Pt. The working electrode was the coupon being evaluated. The tested area of the working electrode was 18 cm². About 3 centimeters of the working electrode was immersed into the NaCl solution. 300 mL of NaCl was added to the cell, and the electrodes inserted into the NaCl solution.

Once the electrochemical cell setup was complete, the potentiostat started registering the open circuit potential (OCV) of the system. After approximately 1.5 hours of exposing the working electrode to the NaCl solution, the OCV became quasi-constant for the coupons. The potential was then increased at a constant rate of 150 mV/s until the current density reached I=3 mA/cm² or until the potential reached 0.9 mV.

Figure 4:
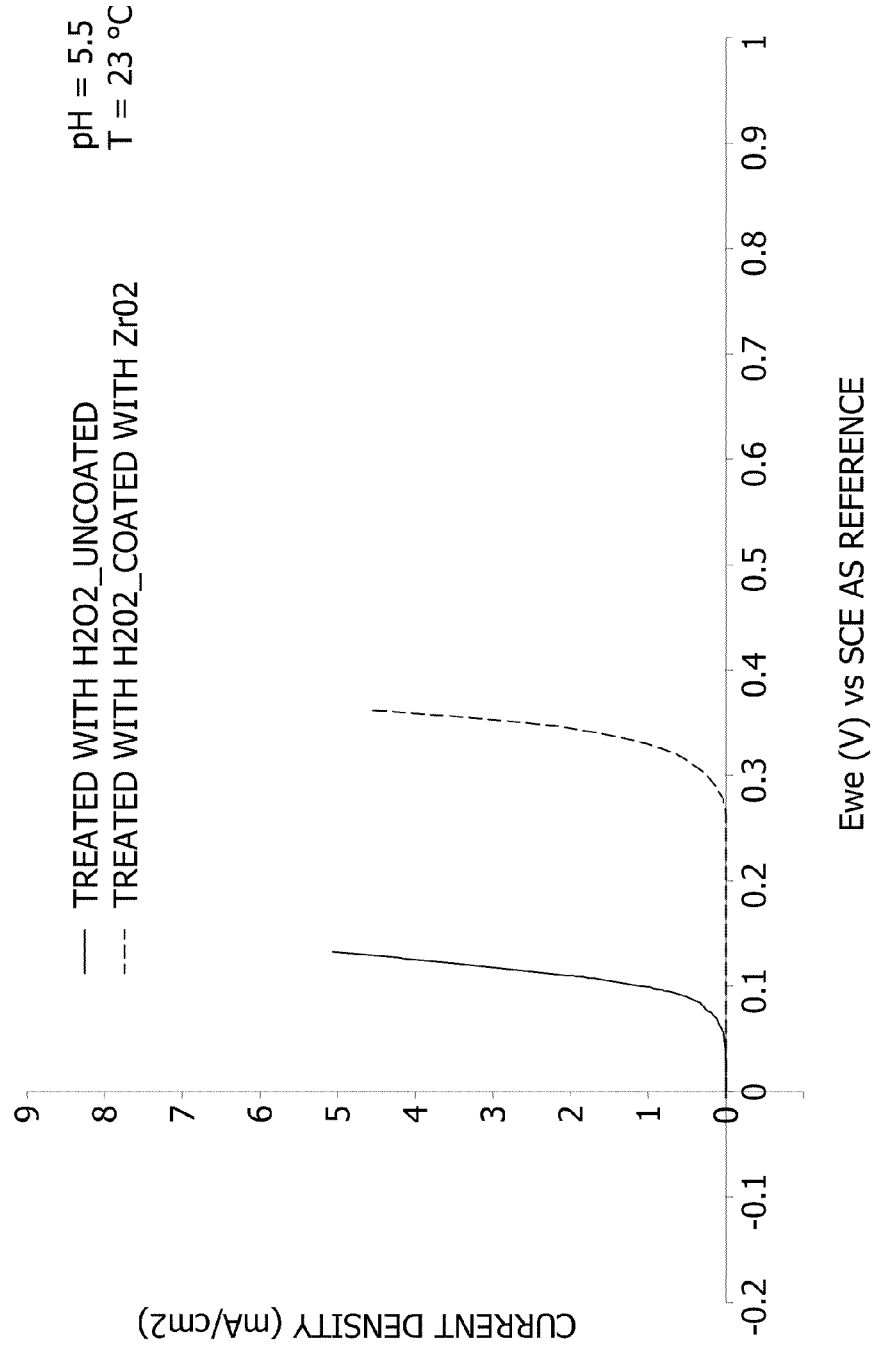
FIG. 4 is a graph showing the pitting potential of various Stainless Steel 201 (Brushed) Coupons immersed in a deaerated 1M NaCl solution.

Referring now to FIG. 4, there is shown CV curves for each of the coupons evaluated. FIG. 4 shows that the pitting potential (i.e., a sharp increase in the current density) is dependent upon the presence or absence of the nanoporous submicron metal oxide film as described herein. The coupon having only the oxidation layer incurred a sharp increase in current density of around 0.8 V. In contrast, the coupon having an oxidation layer and a nanoporous coating as described herein incurred a sharp increase in current density of about 0.31 V.

For the coupon having the nanoporous coating, the gradual increase in potential is theoretically associated with nucleation of pits and formation of metastable pits. The sharp/spike increase in potential is theoretically associated with the growth of stable pits.

Visual inspection of the coated and uncoated coupons after the sharp increase in current revealed the existence of some pits. As such, the increase in current density was associated with pitting and not with the transpassive potential of the uncoated substrate material. Transpassive potential is associated with the point in time when general dissolution of the passivated layer occurs.

In conclusion, sintered nanoporous, sub-micron thin films derived from dip-coated liquid sols comprising the metal oxides provided significant protection from pitting as compared to untreated (oxidation layer only) coupon.

Example 5

Electrochemical testing and evaluation for pitting potential of stainless steel 436 (brushed) coupons immersed in deaerated 1M NaCl solution (pH=5.5) was conducted. The stainless steel 436 (brushed) coupons had various surface coatings thereon as set forth below. Each coupon tested was a square plate of either 1 inch by two inches or one inch by four inches.

The stainless steel 436 (brushed) coupons evaluated were as follows: (1) surface treated with a wet oxidation procedure ("A"); (2) surface treated with a wet oxidation procedure ("B"); (3) surface treated with a wet oxidation procedure plus a coating of $ZrO_2$ ("C"); and (4) surface treated with a wet oxidation procedure plus a coating of $ZrO_2$ ("D").

For the wet oxidation step, the following procedure was used. The stainless steel 436 (brushed) coupon was immersed for 1 hour in a basic (pH=13) solution of hydrogen peroxide (6%) and then removed, washed with MQ water, and dried at room temperature in air. This resulted in an oxidation layer having a thickness of about 100 nanometers.

The preparation of the $ZrO_2$ sol was done by the hydrolysis of Zr propoxide in a nitric acid solution including 3 mL of concentrated nitric acid in 150 mL of water and 11 mL of $Zr(OPr)_4$. After one day of strong stirring, a white suspension formed upon mixing the propoxide, and the aqueous phase became transparent due to peptization. The transparent sol was then dialyzed in MQ water until a pH of 3.2 was obtained. The solids concentration was about 12 g/L.

Dip coating was performed on the coupon to introduce the nanoporous film onto the oxidized layer. The coupon was dip coated into the $ZrO_2$ sol and withdrawn at a speed of about 3 millimeters per second. Once removed from the dip coating chamber, the coupon was dried at 100° C. for about 30 minutes and then cooled to room temperature in air. After the drying of the nanoporous coating was complete, the coated coupon was subjected to a sintering step that included heating the coupon at 10° C. per minute to 300° C. and then dwelled at 300° C. for 1 hour and then cooled to room temperature in air. This process resulted in a nanoporous film having a thickness of between about 200 nanometers and about 300 nanometers.

Anodic Polarization Measurements: Localized corrosion resistance was measured for all of the coupons described above. The tests were done in deaerated 1M NaCl solution at 23° C.

The elements of the electrochemical cell included the following: 1M NaCl deaerated solution; temperature of 23° C.; V=300 mL; a Calomel Reference electrode; and a Pt Counter Electrode=Pt. The working electrode was the coupon being evaluated. The tested area of the working electrode was 18 $cm^2$. About 3 centimeters of the working electrode was immersed into the NaCl solution. 300 mL of NaCl was added to the cell, and the electrodes inserted into the NaCl solution.

Once the electrochemical cell setup was complete, the potentiostat started registering the open circuit potential (OCV) of the system. After approximately 1.5 hours of exposing the working electrode to the NaCl solution, the OCV became quasi-constant for the coupons. The potential was then increased at a constant rate of 150 mV/s until the current density reached I=3 $mA/cm^2$ or until the potential reached 0.9 mV.

Figure 5:
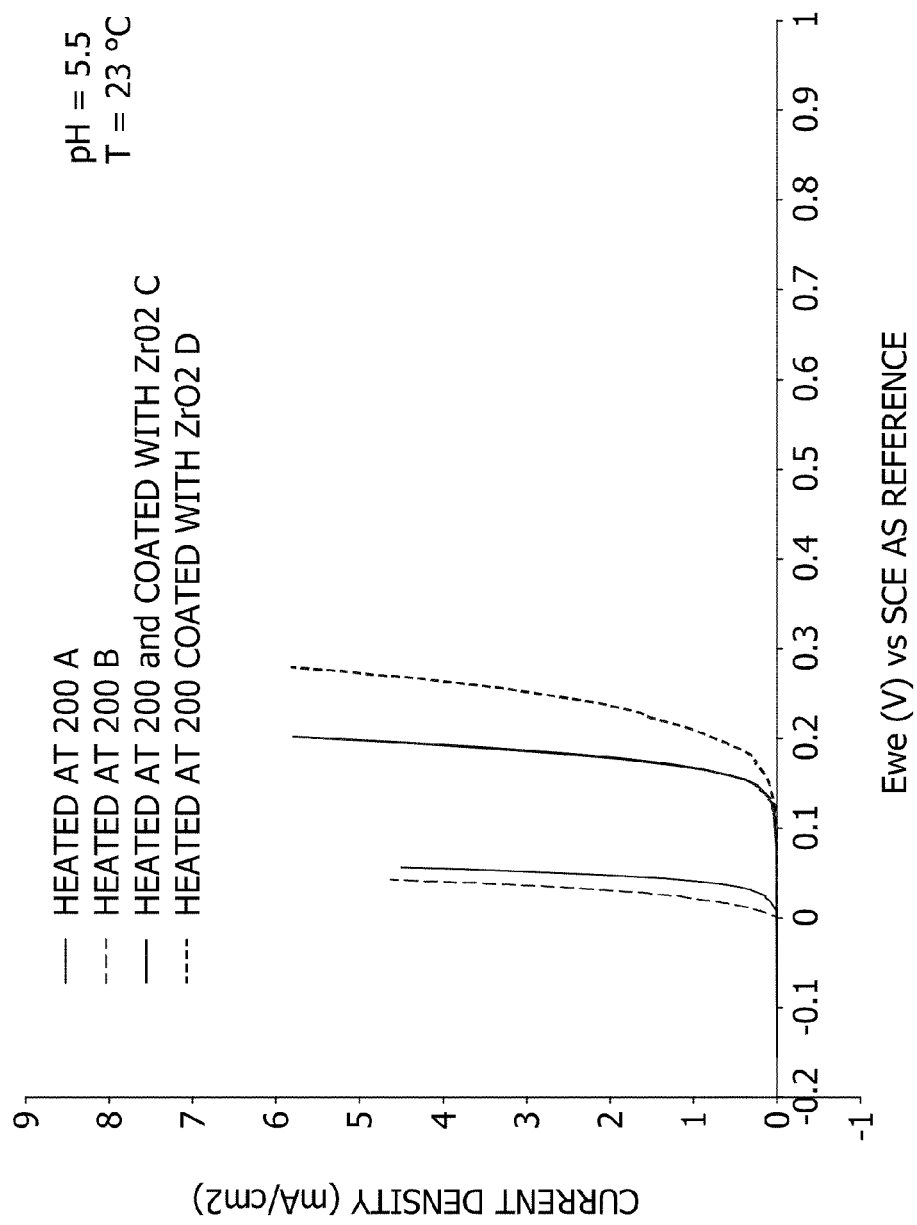
FIG. 5 is a graph showing the pitting potential of various Stainless Steel 436 (Brushed) Coupons immersed in a deaerated 1M NaCl solution.

Referring now to FIG. 5, there is shown CV curves for each of the coupons evaluated. FIG. 5 shows that the pitting potential (i.e., a sharp increase in the current density) is dependent upon the presence or absence of the nanoporous submicron metal oxide film as described herein. The coupons having only the oxidation layer incurred a sharp increase in current density of around 0.0 V. In contrast, the coupons having an oxidation layer and a nanoporous coating as described herein incurred a sharp increase in current density of about 0.15 V to about 0.18 V.

For the coupons having the nanoporous coating, the gradual increase in potential is theoretically associated with nucleation of pits and formation of metastable pits. The sharp/spike increase in potential is theoretically associated with the growth of stable pits.

Visual inspection of the coated and uncoated coupons after the sharp increase in current revealed the existence of some pits. As such, the increase in current density was associated with pitting and not with the transpassive potential of the uncoated substrate. Transpassive potential is associated with the point in time when general dissolution of the passivated layer occurs.

In conclusion, sintered nanoporous, sub-micron thin films derived from dip-coated liquid sols comprising the metal oxides provided significant protection from pitting as compared to untreated (oxidation layer only) coupon.

Example 6

Electrochemical testing and evaluation for pitting potential of black reinforcing steel rebar immersed in aerated 0.25M NaCl solution saturated with $Ca(OH)_2$ was conducted. The black reinforcing steel rebar had various surface coatings thereon as set forth below.

The black reinforcing steel rebar sample evaluated were as follows: (1) surface treated with 0.1 N HCl acid wash ("A"); (2) surface treated with 0.1 N HCl acid wash ("B"); (3) surface treated with 0.1 N HCl acid wash plus a coating of $TiO_2$ ("C"); and (4) surface treated with 0.1 N HCl acid wash plus a coating of $ZrO_2$ ("D").

The preparation of the $TiO_2$ sol was done by hydrolysis of titanium isopropoxide in a nitric acid solution including 1.43 mL of concentrated nitric acid in 200 mL of water and 33 mL of $Ti(OPR)_4$. A white precipitate was obtained upon mixing the $Ti(OPr)_4$ with the aqueous phase becoming transparent due to peptization under strong stirring of the suspension. The suspension became a transparent sol, and the sol was placed in a Spectra/Por dialysis tubing and dialyzed against pure water (MQ) to slowly adjust the pH to 3.5. The solids concentration was about 25 g/L.

The preparation of the $ZrO_2$ sol was done by the hydrolysis of Zr propoxide in a nitric acid solution including 3 mL of concentrated nitric acid in 150 mL of water and 11 mL of $Zr(OPr)_4$. After one day of strong stirring, a white suspension formed upon mixing the propoxide, and the aqueous phase became transparent due to peptization. The transparent sol was then dialyzed in MQ water until a pH of 3.2 was obtained. The solids concentration was about 12 g/L.

Dip coating was performed on the black rebar samples to introduce the nanoporous film onto the oxidized layer. The sample was dip coated into the $ZrO_2$ sol and withdrawn at a speed of about 3 millimeters per second. Once removed from the dip coating chamber, the coupon was dried at 100° C. for about 30 minutes and then cooled to room temperature in air. After the drying of the nanoporous coating was complete, the coated sample was subjected to a sintering step that included heating the sample at 10° C. per minute to 300° C. and then dwelled at 300° C. for 1 hour and then cooled to room temperature in air. This process resulted in a nanoporous film having a thickness of between about 200 nanometers and about 300 nanometers.

Anodic Polarization Measurements: Localized corrosion resistance was measured for all of the samples described above. The tests were done in aerated 0.25M NaCl and saturated in $Ca(OH)_2$ solution and at 23° C.

The elements of the electrochemical cell included the following: 0.25 M NaCl deaerated solution saturated in $Ca(OH)_2$; temperature of 23° C.; V=300 mL; a Calomel Reference electrode; and a Pt Counter Electrode=Pt. The working electrode was the sample being evaluated. The tested area of the working electrode was 18 $cm^2$. About 3 centimeters of the working electrode was immersed into the $NaCl/Ca(OH)_2$ solution. 300 mL of $NaCl/Ca(OH)_2$ was added to the cell, and the electrodes inserted into the solution.

Once the electrochemical cell setup was complete, the potentiostat started registering the open circuit potential (OCV) of the system. After approximately 1.5 hours of exposing the working electrode to the $NaCl/Ca(OH)_2$ solution, the OCV became quasi-constant for the samples. The potential was then increased at a constant rate of 150 mV/s until the current density reached I=3 mA/cm² or until the potential reached 0.9 mV.

Figure 6:
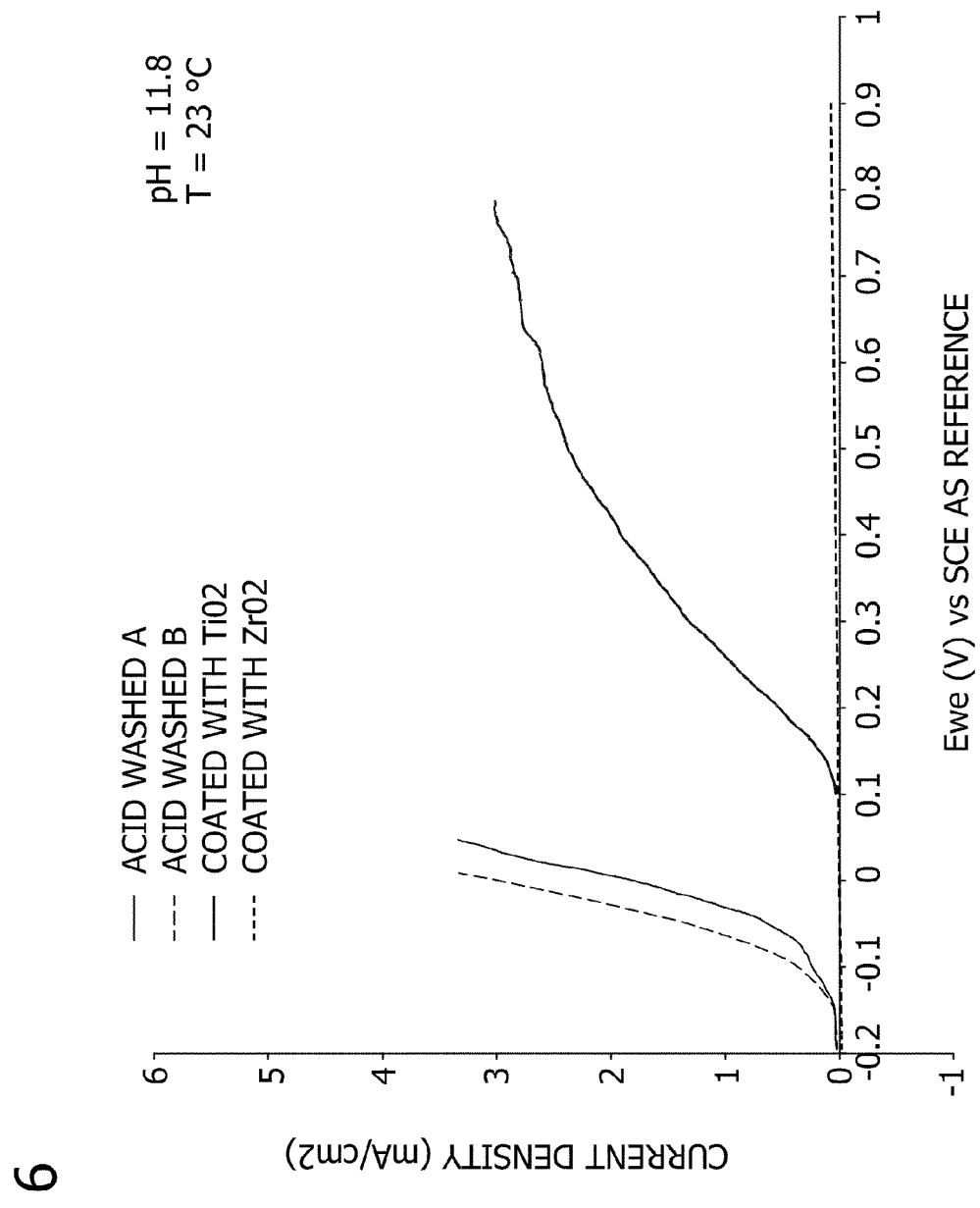
FIG. 6 is a graph showing the pitting potential of black rebar samples immersed in 0.23M NaCl solution, saturated in $Ca(OH)_2$.

Referring now to FIG. 6, there is shown CV curves for each of the samples evaluated. FIG. 6 shows that the pitting potential (i.e., a sharp increase in the current density) is dependent upon the presence or absence of the nanoporous submicron metal oxide film as described herein. The samples that were subjected to the acid wash only incurred a sharp increase in current density of around −0.1 V. In contrast, the one sample that was subjected to an acid wash and had a nanoporous coating as described herein incurred a gradual increase in current density around 0.2 V and the second sample that was subjected to an acid wash and had a nanoporous coating did not register an increase in current at all.

For the sample having the nanoporous coating of $TiO_2$, the gradual increase in potential is theoretically associated with nucleation of pits and formation of metastable pits. The sharp/spike increase in potential is theoretically associated with the growth of stable pits.

Visual inspection of the coated and uncoated coupons after the sharp increase in current revealed the existence of some pits, with the exception of the sample coated with $ZrO_2$. As such, the increase in current density was associated with pitting and not with the transpassive potential of the uncoated substrate material. Transpassive potential is associated with the point in time when general dissolution of the passivated layer occurs.

In conclusion, sintered nanoporous, sub-micron thin films derived from dip-coated liquid sols comprising the metal oxides provided significant protection from pitting as compared to untreated (acid wash only) samples.

Example 7

Electrochemical testing and evaluation for pitting potential of aluminum coupons immersed in sea water (Instant Ocean Solution) was conducted. The aluminum coupons had various surface coatings thereon as set forth below. Each coupon tested was a square plate of either 1 inch by two inches or one inch by four inches.

The aluminum coupons evaluated were as follows: (1) surface treated with a wet oxidation procedure; and (2) surface treated with a wet oxidation procedure plus a coating of a mixture of $TiO_2$ and $SiO_2$.

For the wet oxidation step, the following procedure was used. The aluminum coupon was immersed in a 0.1 N NaCl solution for 1 hour and then removed, rinsed with MQ water and dried at room temperature. This resulted in an oxidation layer having a thickness of about 100 nanometers.

The preparation of the $ZrO_2$ sol was done by the hydrolysis of Zr propoxide in a nitric acid solution including 3 mL of concentrated nitric acid in 150 mL of water and 11 mL of $Zr(OPr)_4$. After one day of strong stirring, a white suspension formed upon mixing the propoxide, and the aqueous phase became transparent due to peptization. The transparent sol was then dialyzed in MQ water until a pH of 3.2 was obtained. The solids concentration was about 12 g/L.

The preparation of the $SiO_2$ sol was done by using tetraethyl orthosilicate which was hydrolyzed in an ammonia based solution (0.5M) by stirring one hour at room temperature. The sol was then aged for 24 hours, and the large particles or precipitates were removed by filtration. A hydroxide solution was then added with stirring. The concentration $SiO_2$ was 30 g/L.

The preparation of the $ZrO_2/SiO_2$ was done by mixing the sols in a weight ratio of 70% $ZrO_2$ and 30% $SiO_2$.

Dip coating was performed on the coupon to introduce the nanoporous film onto the oxidized layer. The coupon was dip coated into the sol and withdrawn at a speed of about 3 millimeters per second. Once removed from the dip coating chamber, the coupon was dried at 100° C. for about 30 minutes and then cooled to room temperature in air. After the drying of the nanoporous coating was complete, the coated coupon was subjected to a sintering step that included heating the coupon at 10° C. per minute to 300° C. and then dwelled at 300° C. for 1 hour and then cooled to room temperature in air. This process resulted in a nanoporous film having a thickness of between about 200 nanometers and about 300 nanometers.

Anodic Polarization Measurements: Localized corrosion resistance was measured for each of the two coupons described above. The tests were done in aerated solutions at a temperature of 23° C. and a pH of 8.1.

The elements of the electrochemical cell included the following: a surrogate sea water solution ("Instant Ocean") saturated with oxygen; temperature of 23° C.; V=300 mL; a Calomel Reference electrode; and a Pt Counter Electrode=Pt. The working electrode was the coupon being evaluated. The tested area of the working electrode was 18 cm². About 3 centimeters of the working electrode was immersed into the sea water solution. 300 mL of sea water solution was added to the cell, and the electrodes inserted into the sea water solution.

Once the electrochemical cell setup was complete, the potentiostat started registering the open circuit potential (OCV) of the system. After approximately 1.5 hours of exposing the working electrode to the sea water solution, the OCV became quasi-constant for the coupons. The potential was then increased at a constant rate of 150 mV/s until the current density reached I=3 mA/cm² or until the potential reached 0.9 mV.

Figure 7:
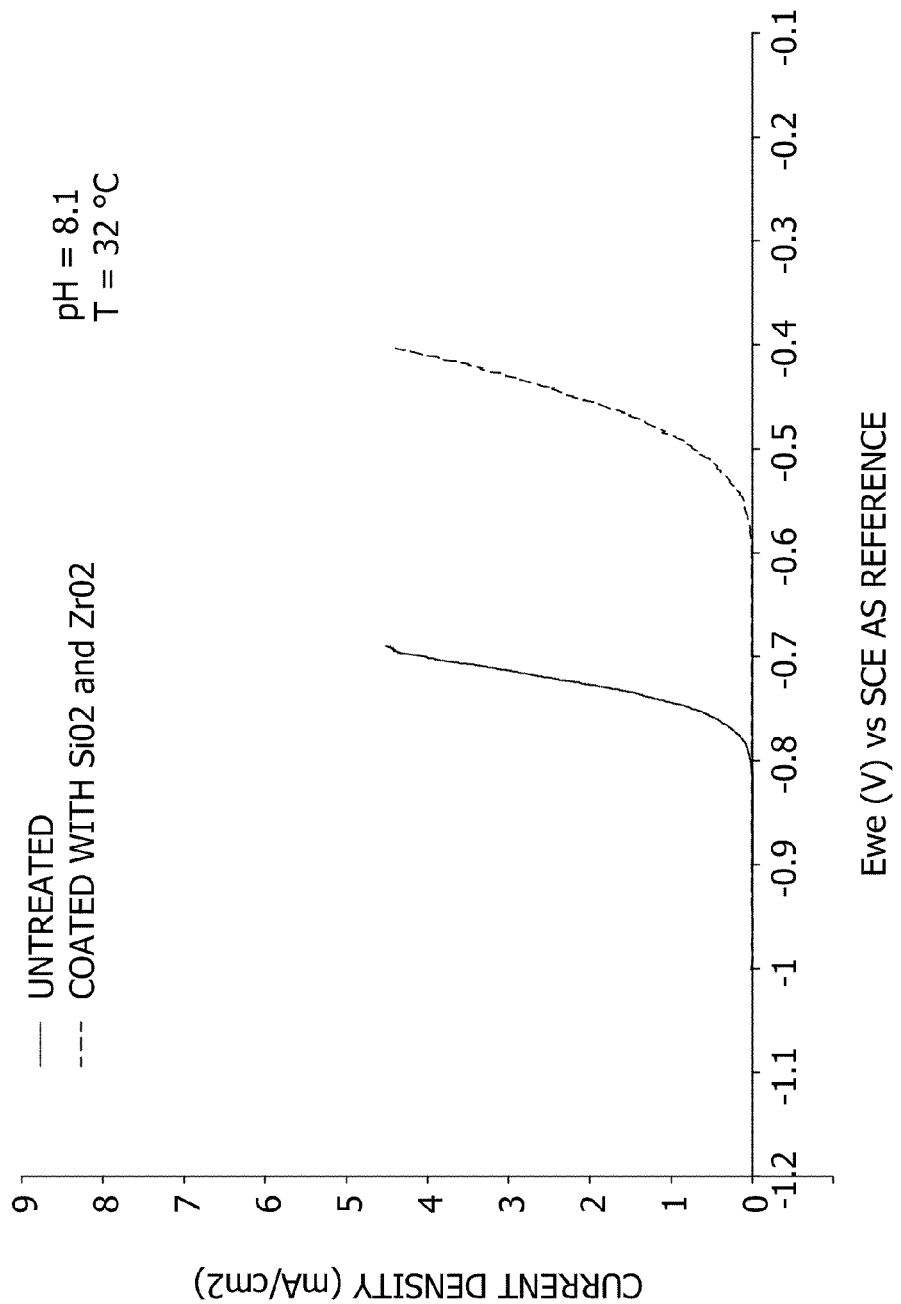
FIG. 7 is a graph showing the pitting potential of aluminum coupons immersed in an Instant Ocean Solution.

Referring now to FIG. 7, there is shown CV curves for each of the coupons evaluated. FIG. 7 shows that the pitting potential (i.e., a sharp increase in the current density) is dependent upon the presence or absence of the nanoporous submicron metal oxide film as described herein. The untreated coupon incurred a sharp increase in current density of around −0.8 V. In contrast, the coupon having a nanoporous coating as described herein incurred a sharp increase in current density no less than about −0.55 V. The curve increase associated with the coupon having a nanoporous coating is not as sharp as the curve for the uncoated coupon.

For the coupon having the nanoporous coating, the gradual increase in potential is theoretically associated with nucleation of pits and formation of metastable pits. The sharp/spike increase in potential is theoretically associated with the growth of stable pits.

Visual inspection of the coated and uncoated coupons after the sharp increase in current revealed the existence of some pits. As such, the increase in current density was associated with pitting and not with the transpassive potential of the uncoated substrate. Transpassive potential is associated with the point in time when general dissolution of the passivated layer occurs.

In conclusion, sintered nanoporous, sub-micron thin films derived from dip-coated liquid sols comprising the mixture of metal oxides provided significant protection from pitting as compared to untreated coupons.

Example 8

In this Example, various heat exchanger plates (316 stainless steel) from two Plate Heat Exchangers (PHE) were evaluated for pitting corrosion over an extended time after continuous exposure to sea water. The various heat exchanger plates were dip-coated three times in a liquid solution of titanium dioxide to form a titanium dioxide nanoporous film as described herein and compared to uncoated 316 stainless steel coupons used as controls.

The first Plate Heat Exchanger (Model JR) contained 16 PHE plates (3"×19"). The first Plate Heat Exchanger was exposed to a seawater solution having a pH of about 8.4 and a temperature of about 144° F. (62° C.) for a period of about 18 months. After 18 months, the first Plate Heat Exchanger was removed from the solution, disassembled, and the plates were inspected for wear (i.e., erosion and corrosion).

The second Plate Heat Exchanger (Model M3) contained 12 PHE plates (5"×16"). The second Plate Heat Exchanger was exposed to a seawater solution having a pH of about 8.4 and a temperature of about 144° F. (62° C.) for a period of about one month. After one month, 12 more plates (plates 13-24) were added to the second Plate Heat Exchanger and the Exchanger was again exposed to the seawater solution for a period of another month. The second Plate Heat Exchanger was then briefly removed from the solution for a period of less than one week to determine if a short lack of being in service would affect performance of the coating. It was then placed back in service and after an additional 3.5 months, the second Plate Heat Exchanger was disassembled and all 24 plates were inspected for wear (i.e., erosion and corrosion). "Failure" is the term used herein to indicate that holes were detected in the plates.

The corrosion results for the plates of both the first Plate Heat Exchanger and the second Plate Heat Exchanger, once removed from the solution and disassembled, are shown in Table 1.

TABLE 1

| First Plate Heat Exchanger (18 months) | | Second Plate Heat Exchanger (4-5 months) | |
|---|---|---|---|
| Plate Number | Visual Inspection | Plate Number | Visual Inspection |
| 1 | No corrosion | 1 | No corrosion |
| 2 | No corrosion | 2 | No corrosion |
| 3 | No corrosion | 3 | No corrosion |
| 4 | Slight wear | 4 | No corrosion |
| 5 | No corrosion | 5 | No corrosion |
| 6 | No corrosion | 6 | No corrosion |
| 7 | No corrosion | 7 | No corrosion |
| 8 | Slight wear | 8 | No corrosion |
| 9 | No corrosion | 9 | No corrosion |
| 10 | No corrosion | 10 | No corrosion |
| 11 | Slight wear | 11 | No corrosion |
| 12 | No corrosion | 12 | No corrosion |
| 13 | No corrosion | 13 | No corrosion |
| 14 | No corrosion | 14 | No corrosion |
| 15 | No corrosion | 15 | No corrosion |
| 16 | No corrosion | 16 | No corrosion |
| | | 17 | Failure |
| | | 18 | No corrosion |
| | | 19 | No corrosion |
| | | 20 | No corrosion |
| | | 21 | No corrosion |
| | | 22 | No corrosion |
| | | 23 | No corrosion |
| | | 24 | No corrosion |

As shown in Table 1, 13 of the 16 plates in the first Plate Heat Exchanger showed no signs of corrosion. Moreover, while one plate in the second Plate Heat Exchanger failed, all other plates showed no signs of corrosion. It should be noted that the one plate, plate number 17, was actually not coated with the liquid solution of titanium dioxide.

The first and second Plate Heat Exchangers were then reassembled and again exposed to a seawater solution having a pH of about 8.4 and a temperature that ranged from about 120° F. (49° C.) to about 140° F. (60° C.). The first and second Plate Heat Exchangers were exposed for the periods as indicated in Table 2, and then again disassembled. The plates were subjected to dye penetrant testing to detect any cracks and pin holes and inspected for wear. The results are shown in Table 2.

TABLE 2

| First Plate Heat Exchanger (26 months) | | Second Plate Heat Exchanger (13 months) | |
|---|---|---|---|
| Plate Number | Dye Penetration Test | Plate Number | Visual Inspection |
| 1 | No holes | 1 | No holes |
| 2 | No holes | 2 | No holes |
| 3 | No holes | 3 | No holes |
| 4 | No holes | 4 | No holes |
| 5 | No holes | 5 | No holes |
| 6 | No holes | 6 | No holes |
| 7 | Failed | 7 | No holes |
| 8 | No holes | 8 | No holes |
| 9 | No holes | 9 | No holes |
| 10 | No holes | 10 | No holes |
| 11 | No holes | 11 | No holes |
| 12 | No holes | 12 | No holes |
| 13 | No holes | 13 | No holes |
| 14 | No holes | 14 | No holes |
| 15 | No holes | 15 | No holes |
| 16 | No holes | 16 | No holes |
| | | 17 | Removed |
| | | 18 | No holes |
| | | 19 | No holes |
| | | 20 | No holes |
| | | 21 | No holes |
| | | 22 | No holes |
| | | 23 | No holes |
| | | 24 | No holes |

As shown in Table 2, 15 of the 16 plates in the first Plate Heat Exchanger showed no signs of holes (pitting). Moreover, none of the 23 plates left in the second Plate Heat Exchanger showed the presence of holes.

After inspection, the titanium dioxide-coated plates were cut into 1 cm$^2$ pieces, washed, and sputtered (250 mA) with platinum for a period of about one minute. The pieces were then examined using a LEO SEM under 500,000 magnification. It was found that most of the titanium dioxide nanoparticles had a diameter in the range of from about 6 nm to about 12 nm, and the inter particle pores had a diameter of about 4 nm.

We claim:

1. A heat exchanger comprising: a substrate member constructed of a metal, wherein the metal is selected from the group consisting of stainless steel, black rebar, carbon steel, and aluminum; an oxidized layer on a surface of the substrate member, wherein the oxidized layer has a thickness of less than 100 nanometers; and a first nanoporous film comprising titanium dioxide and silicon dioxide, the nanoporous film being chemically bonded to the oxidized layer, the nanoporous film having a thickness of from about 200 nanometers to about 300 nanometers and having a porosity of from about 26% to about 80%.

2. The heat exchanger of claim 1 further including a second nanoporous film on top of the first nanoporous film, the second nanoporous film comprising oxygen and an element selected from the group consisting of aluminum, titanium, silicon, zirconium and combinations thereof, the second nanoporous film having a thickness of less than 1 micrometer and having a porosity of from about 26% to about 80%.

3. The heat exchanger of claim 2 wherein the second nanoporous film has a thickness of from about 0.01 micrometers to less than 1.0 micrometer.

4. The heat exchanger of claim 2 wherein the metal is selected from the group consisting of stainless steel, carbon steel, and aluminum.

5. The heat exchanger of claim 2 further including a third nanoporous film.

6. The heat exchanger of claim 1 wherein the first nanoporous film further comprises aluminum oxide.

7. The heat exchanger of claim 1 wherein the nanoporous film comprises nanoparticles having a particle size of from about 1.5 nanometers to about 50 nanometers.

8. The heat exchanger of claim 1 wherein the heat exchanger is selected from the group consisting of plate heat exchanger, shell and tube heat exchanger, and cooling tower.

9. The heat exchanger of claim 1 wherein the first nanoporous film further comprises zirconium oxide.

10. The heat exchanger of claim 1 wherein the nanoporous film has a porosity of about 26%.

11. A heat exchanger comprising: a substrate member constructed of a metal, wherein the metal is selected from the group consisting of stainless steel, black rebar, carbon steel, and aluminum; an oxidized layer on a surface of the substrate member, wherein the oxidized layer has a thickness of less than 100 nanometers; and a first nanoporous film comprising aluminum oxide, the nanoporous film being chemically bonded to the oxidized layer, the nanoporous film having a thickness of from about 200 nanometers to about 300 nanometers and having a porosity of from about 26% to about 80%.

12. The heat exchanger of claim 11 further including a second nanoporous film on top of the first nanoporous film, the second nanoporous film comprising oxygen and an element selected from the group consisting of aluminum, titanium, silicon, zirconium and combinations thereof, the second nanoporous film having a thickness of less than 1 micrometer and having a porosity of from about 26% to about 80%.

13. The heat exchanger of claim 12 wherein the second nanoporous film has a thickness of from about 0.01 micrometers to less than 1.0 micrometer.

14. The heat exchanger of claim 12 wherein the metal is selected from the group consisting of stainless steel, carbon steel, and aluminum.

15. The heat exchanger of claim 12 further including a third nanoporous film.

16. The heat exchanger of claim 11 wherein the first nanoporous film further comprises titanium dioxide and silicon dioxide.

17. The heat exchanger of claim 11 wherein the nanoporous film comprises nanoparticles having a particle size of from about 1.5 nanometers to about 50 nanometers.

18. The heat exchanger of claim 11 wherein the heat exchanger is selected from the group consisting of plate heat exchanger, shell and tube heat exchanger, and cooling tower.

19. The heat exchanger of claim 11 wherein the first nanoporous film further comprises zirconium oxide.

20. The heat exchanger of claim 11 wherein the nanoporous film has a porosity of about 26%.

* * * * *